(12) United States Patent
Aoki

(10) Patent No.: US 11,468,805 B2
(45) Date of Patent: Oct. 11, 2022

(54) LIQUID CRYSTAL PROJECTOR AND METHOD FOR CONTROLLING LIQUID CRYSTAL PROJECTOR

(71) Applicant: SEIKO EPSON CORPORATION, Tokyo (JP)

(72) Inventor: Toru Aoki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/526,597

(22) Filed: Nov. 15, 2021

(65) Prior Publication Data

US 2022/0157211 A1    May 19, 2022

(30) Foreign Application Priority Data

Nov. 16, 2020   (JP)  .............................. JP2020-190323

(51) Int. Cl.
*G09G 3/00* (2006.01)
*G09G 3/36* (2006.01)
*G03B 21/00* (2006.01)

(52) U.S. Cl.
CPC ........... *G09G 3/002* (2013.01); *G03B 21/006* (2013.01); *G09G 3/3607* (2013.01); *G09G 2310/08* (2013.01); *G09G 2320/0233* (2013.01); *G09G 2340/0407* (2013.01)

(58) Field of Classification Search
CPC ..................................................... G09G 3/002
See application file for complete search history.

(56) References Cited

U.S. PATENT DOCUMENTS

2008/0192155 A1*   8/2008   Uchiyama .......... H04N 9/3155
349/8

FOREIGN PATENT DOCUMENTS

| JP | H04-063332 A | 2/1992 |
| JP | H05-088280 A | 4/1993 |
| JP | H11-008859 A | 1/1999 |
| JP | 2004-184902 A | 7/2004 |

* cited by examiner

*Primary Examiner* — Gustavo Polo
(74) *Attorney, Agent, or Firm* — Oliff PLC

(57) ABSTRACT

A liquid crystal projector includes a red liquid crystal panel, a green liquid crystal panel, a blue liquid crystal panel, a green liquid crystal panel, an optical shift element configured to shift an emission optical path of a synthesized image of each liquid crystal panel, and a control circuit configured to control these. The control circuit controls the optical shift element to set a projection position to a projection position (A) in a subframe f1 and to a projection position (B) in a subframe f2. The control circuit causes a resolution of the liquid crystal panel expressed in the subframes f1 and f2 to be lower than the resolution of the liquid crystal panel expressed in the subframes f1 and f2.

10 Claims, 10 Drawing Sheets

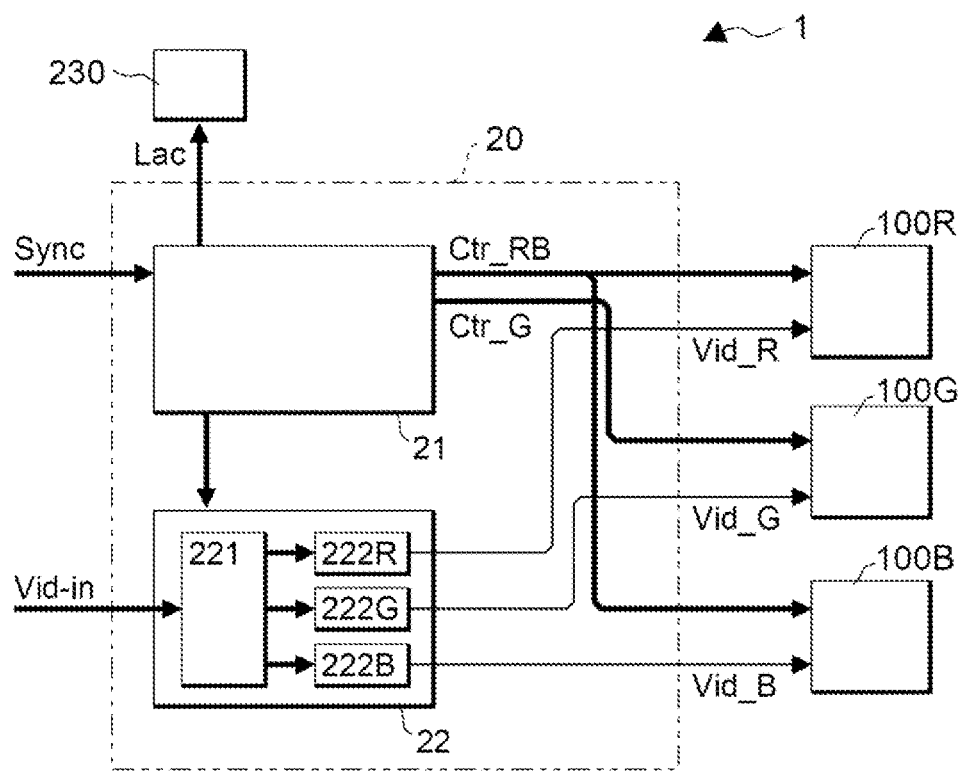
FIG. 2
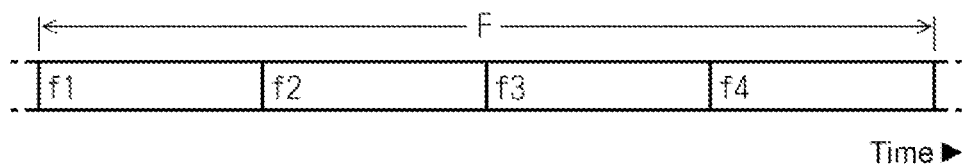
FIG. 3
<DISPLAY PIXEL OF VIDEO DATA>   <PANEL PIXEL>
| A1 | A2 | A3 | A4 | A5 | A6 |
|----|----|----|----|----|----|
| B1 | B2 | B3 | B4 | B5 | B6 |
| C1 | C2 | C3 | C4 | C5 | C6 |
| D1 | D2 | D3 | D4 | D5 | D6 |
| E1 | E2 | E3 | E4 | E5 | E6 |
| F1 | F2 | F3 | F4 | F5 | F6 |
| a1 | a2 | a3 |
|----|----|----|
| b1 | b2 | b3 |
| c1 | c2 | c3 |
FIG. 4

LIQUID CRYSTAL PROJECTOR AND METHOD FOR CONTROLLING LIQUID CRYSTAL PROJECTOR

The present application is based on, and claims priority from JP Application Serial Number 2020-190323, filed Nov. 16, 2020, the disclosure of which is hereby incorporated by reference herein in its entirety.

BACKGROUND

1. Technical Field

The present disclosure relates to a liquid crystal projector and a method for controlling the liquid crystal projector.

2. Related Art

In a liquid crystal projector, a technique of shifting the position of a pixel projected on a screen or the like by a shift device is known (see, for example, JP-A-4-063332). This technique allows the user to visually recognize an image in which a resolution of a liquid crystal panel is artificially increased. By increasing the number of positions (the number of shifts) of the pixel to be projected, the resolution of the image can be further increased. The shift device is also called an optical shift element or an optical axis shift element.

In the above-described technology, when the number of positions of the pixel to be projected is increased, the resolution visually recognized to the user can be increased, but on the other hand, the optical response of the liquid crystal panel must be increased, which leads to an adverse effect such as a decrease in brightness.

SUMMARY

In order to solve the above-described issue, a liquid crystal projector according to one aspect of the present disclosure includes a synthesizing unit including a first liquid crystal panel configured to generate a first modulated image of first color light, a second liquid crystal panel configured to generate a second modulated image of second color light having a wavelength shorter than that of the first color light, and a third liquid crystal panel configured to generate a third modulated image of third color light having a wavelength shorter than that of the second color light, and configured to synthesize the first modulated image, the second modulated image, and the third modulated image, an optical shift element configured to shift an emission optical path of a synthesized image by the synthesizing unit, and a control circuit configured to control the first liquid crystal panel, the second liquid crystal panel, the third liquid crystal panel, and the optical shift element, wherein the control circuit is configured to control the optical shift element to shift the emission optical path to a first position in a first period and to shift the emission optical path to a second position in a second period after the first period, and is configured to control the first liquid crystal panel, the second liquid crystal panel, the third liquid crystal panel, to cause a resolution of at least one of the first modulated image or the third modulated image expressed in the first period and the second period to be lower than a resolution of the second modulated image expressed in the first period and the second period.

BRIEF DESCRIPTION OF THE DRAWINGS

FIG. 2 is a block diagram illustrating an electrical configuration of the liquid crystal projector.

FIG. 3 is a diagram illustrating the relationship between a frame and a subframe.

FIG. 4 is a diagram illustrating the relationship between a display pixel and a panel pixel, and the like.

FIG. 5 is a diagram illustrating the relationship between the display pixel, a projection position, and the like in G.

FIG. 6 is a diagram illustrating the relationship between the display pixel, the projection position, and the like in R and B.

DESCRIPTION OF EXEMPLARY EMBODIMENTS

An exemplary embodiment will be described below with reference to the accompanying figures. In each figure, a size and a scale of each unit is different from the actual size and the actual scale of each unit as appropriate. Further, the embodiment described below is suitable specific example, and thus various technically preferred limitations are given. Therefore, the scope of the disclosure is not limited to these embodiments unless otherwise stated to limit the disclosure in the following descriptions.

Figure 1:
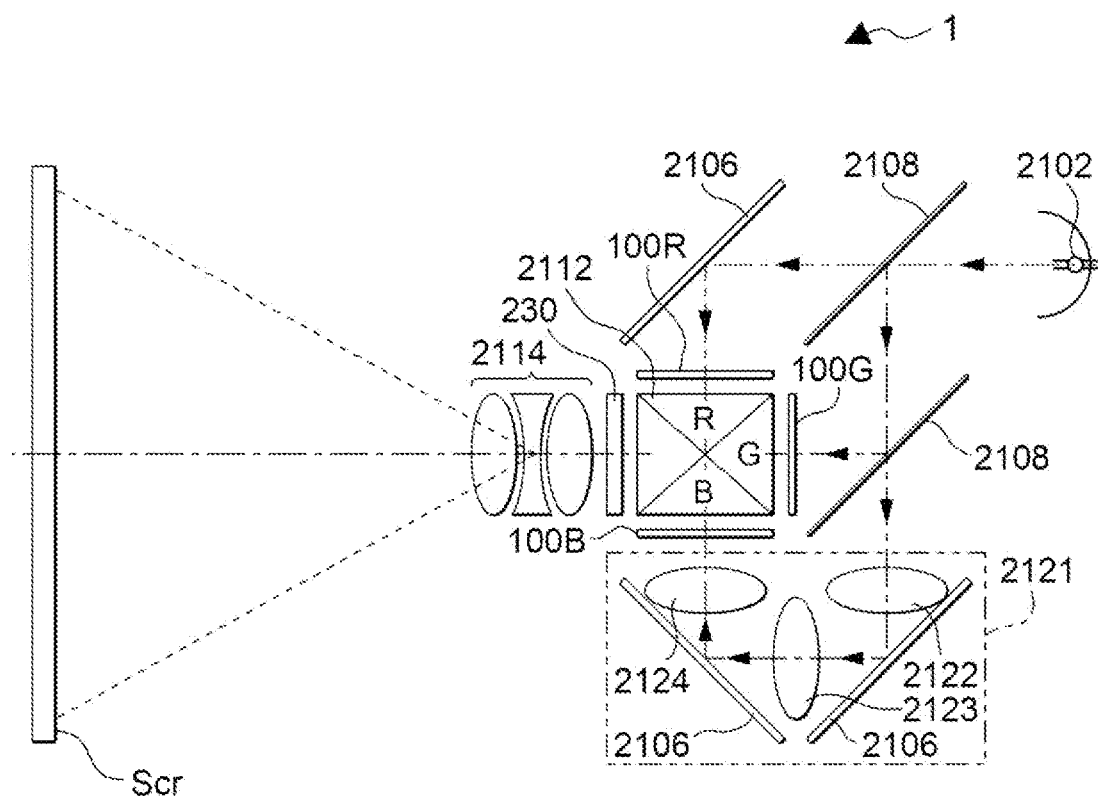
FIG. 1 is a diagram illustrating an optical configuration of a liquid crystal projector according to an exemplary embodiment.

FIG. 1 is a diagram illustrating an optical configuration of a liquid crystal projector 1 according to the exemplary embodiment. FIG. 1 also illustrates a screen Scr on which an image is projected, the left-right direction of a projection surface of the screen Scr is the front side direction or the depth direction of the paper, and the up-down direction of the projection surface is the vertical direction of the paper. As illustrated, the liquid crystal projector 1 includes liquid crystal panels 100R, 100G, and 100B. A lamp unit 2102 including a white light source such as a halogen lamp is provided inside the liquid crystal projector 1. Light emitted from the lamp unit 2102 is split into three primary colors of red (R), green (G), and blue (B) by three mirrors 2106 and two dichroic mirrors 2108 installed inside. Of the light of the primary colors, the light of R, the light of G, and the light of B are incident on the liquid crystal panel 100R, the liquid crystal panel 100G, and the liquid crystal panel 100B, respectively. Further, the lamp unit 2102 may include an LD light source, an LED light source, and a fluorescent light emitter, and may emit white light. The light of R, the light of G, and the light of B correspond to red color light, green color light, and blue color light, respectively, and as is well known, the wavelength of blue color light is shorter than the wavelength of green color light, and the wavelength of green color light is shorter than the wavelength of red color light.

Note that an optical path of B is longer than those of other R and G. Thus, the light of B is guided to the liquid crystal panel 100B via a relay lens system 2121 constituted by an incidence lens 2122, a relay lens 2123, and an emission lens 2124 in order to prevent a loss due to the optical path.

The liquid crystal panel 100R includes pixel circuits arranged in a matrix as described later. The transmittance of light emitted from a liquid crystal element included in the pixel circuit is controlled based on a data signal corresponding to R. That is, in the liquid crystal panel 100R, the light emitted from the liquid crystal element functions as a minimum unit of the image. By such control, the liquid crystal panel 100R generates a modulated image (transmission image) of R based on the data signal corresponding to R. Similarly, the liquid crystal panel 100G generates a modulated image of G based on the data signal corresponding to G, and the liquid crystal panel 100B generates a modulated image of B based on the data signal corresponding to B. The modulated image of R, the modulated image of G, and the modulated image of B correspond to a first modulated image, a second modulated image, and a third modulated image, respectively.

The modulated images of each color generated by each of the liquid crystal panels 100R, 100G, and 100B are incident on a dichroic prism 2112 from three directions. Then, at the dichroic prism 2112, the light of R and the light of B are refracted at 90 degrees, whereas the light of G travels in a straight line. In other words, the dichroic prism 2112 is an example of a synthesizing unit that synthesizes the modulated images of each color. A synthesized image by the dichroic prism 2112 is incident on a projection lens 2114 via an optical shift element 230. The optical shift element 230 shifts an emission optical path from the dichroic prism 2112. Specifically, the optical shift element 230 is configured to shift the image projected on the screen Scr in the left-right direction and the up-down direction on the projection surface. The left-right direction and the up-down direction respectively correspond to the horizontal direction and the vertical direction of the liquid crystal panels 100R, 100G, and 100B.

The projection lens 2114 magnifies and projects the synthesized image that has passed sequentially through the optical shift element 230 and the projection lens 2114, on the screen Scr.

For convenience of explanation, in order to distinguish between a pixel projected on the screen Scr and pixels of the liquid crystal panels 100R, 100G and 100B, the pixel projected on the screen Scr are referred to as a projection pixel, and the pixels of liquid crystal panels 100R, 100G and 100B are referred to as panel pixels. Further, the position of the projection pixel via the optical shift element 230 is simply referred to as a projection position.

Note that while the modulated image by each of the liquid crystal panels 100R and 100B is projected after being reflected by the dichroic prism 2112, the modulated image by the liquid crystal panel 100G travels straightly in the dichroic prism 2112 and is projected. Thus, the modulated image of each of the liquid crystal panels 100R and 100B has a left-right inverted relationship with respect to the modulated image of the liquid crystal panel 100G.

FIG. 2 is a block diagram illustrating an electrical configuration of the liquid crystal projector 1. As illustrated, the liquid crystal projector 1 includes a control circuit 20 in addition to the liquid crystal panels 100R, 100G, and 100B and the optical shift element 230 described above.

The control circuit 20 is to be supplied with video data Vid-in from an upper device such as a host device (not illustrated) in synchronization with a synchronizing signal Sync. The video data Vid-in is data indicating an image to be displayed on the liquid crystal projector 1, and specifically, specifies a gray scale level in the pixel of the image, for example, by 8 bits for each RGB. For convenience of explanation, the pixel of the image indicated by the video data Vid-in is referred to as a display pixel.

The synchronizing signal Sync includes a vertical synchronizing signal instructing the start of the vertical scanning in the video data Vid-in, a horizontal synchronizing signal instructing the start of the horizontal scanning, and a clock signal indicating a timing of one pixel of the video data Vid-in.

In the present embodiment, a color image projected on the screen Scr is expressed by synthesizing the modulated images of each of the liquid crystal panels 100R, 100G, and 100B. Therefore, the pixel which is the minimum unit of the color image can be divided into a red panel pixel by the liquid crystal panel 100R, a green panel pixel by the liquid crystal panel 100G, and a blue panel pixel by the liquid crystal panel 100B. To be exact, the red panel pixel, the green panel pixel, and the blue panel pixel should be described as sub-pixels, but in the present description, they are described as the panel pixels as described above.

The liquid crystal panels 100R, 100G and 100B differ only in the color of the incident light, that is, the wavelength, and the basic structures thereof are common. Therefore, when it is not necessary to specify the color to explain the liquid crystal panels 100R, 100G, and 100B, the reference numeral is denoted by 100.

The control circuit 20 includes a display control circuit 21 and a video processing circuit 22.

In the present embodiment, the arrangement of the display pixels specified by the video data Vid-in is, for example, twice in the vertical direction and twice in the horizontal direction as compared with the arrangement of the panel pixels in the liquid crystal panel 100. In this case, the video data Vid-in including information having four times resolution of that of the liquid crystal panel 100 is input from the upper device. Specifically, in detail, when the panel pixels are arranged in m rows in the vertical direction and n columns in the horizontal direction as described later, the display pixels are arranged in (2m) rows (2n) columns. Both m and n are integers equal to or greater than 2.

In the present embodiment, the emission optical path (projection position) is shifted by the optical shift element 230 in order to cause the projection pixel to be visually recognized at a resolution higher than the resolution of the panel pixel. Specifically, when an image of one frame is displayed by the video data Vid-in, a period for displaying the one frame is divided into four subframes, and the projection position is shifted for each subframe. By such a shift, one panel pixel is visually recognized as if four display pixels are displayed in one frame (four subframes).

Prior to the description of the display control circuit 21 and the video processing circuit 22, in the present embodiment, a specific method for expressing four display pixels specified by the video data Vid-in by one panel pixel of the liquid crystal panel 100 will be described.

FIG. 3 is a diagram illustrating the relationship between the frame and the subframe according to the present embodiment. As illustrated in this figure, in the present embodiment, f1, f2, f3, and f4 are assigned as reference numerals to the four subframes in order of time into which one frame F is divided.

The period length of the frame F is 16.7 milliseconds of one cycle when the frequency of the vertical synchronizing signal included in the synchronizing signal Sync is 60 Hz. In this case, the period lengths of the subframes f1 to f4 are 4.17 milliseconds, respectively.

Next, the relationship between the display pixel whose gray scale level is specified by the video data Vid-in, the panel pixel by the liquid crystal panel 100, and the projection position by the optical shift element 230 will be described. The optical shift element 230 shifts the projection direction from the dichroic prism 2112 as described above, but for convenience, the shift amount is converted into the size of the projection pixel (panel pixel) on the screen Scr.

Further, in the present embodiment, among the three colors of RGB, G having relatively high visibility is displayed at a high resolution, and R and B having relatively low visibility are displayed at a low resolution.

The left column in FIG. 4 is a diagram that extracts and illustrates only a part of the display image indicated by the video data Vid-in. Further, the right column in FIG. 4 is a diagram that extracts and illustrates an arrangement corresponding to the arrangement of the display pixels in the left column of the panel pixels of the liquid crystal panel 100.

In the arrangement of display pixels indicated by the video data Vid-in in FIG. 4, in order to distinguish the pixels, for convenience, as reference numerals, A1 to A6 are given to the first row, B1 to B6 are given to the second row, C1 to C6 are given to the third row, D1 to D6 are given to the fourth row, E1 to E6 are given to the fifth row, and F1 to F6 are given to the sixth row, respectively.

In the arrangement of the panel pixels in FIG. 4, in order to distinguish the pixels, for convenience, as reference numerals, a1 to a3 are given to the first row, b1 to b3 are given to the second row, and c1 to c3 are given to the third row, respectively.

FIG. 4 illustrates that, in the arrangement of the display pixels of the video data, a total of four display pixels of 2×2 illustrated by a thick line frame are expressed by one panel pixel. For example, four display pixels A1, A2, B2, and B1 are expressed by one panel pixel a1. Further, for example, four display pixels A3, A4, B4, and B3 are expressed by one panel pixel a2.

Figure 5:
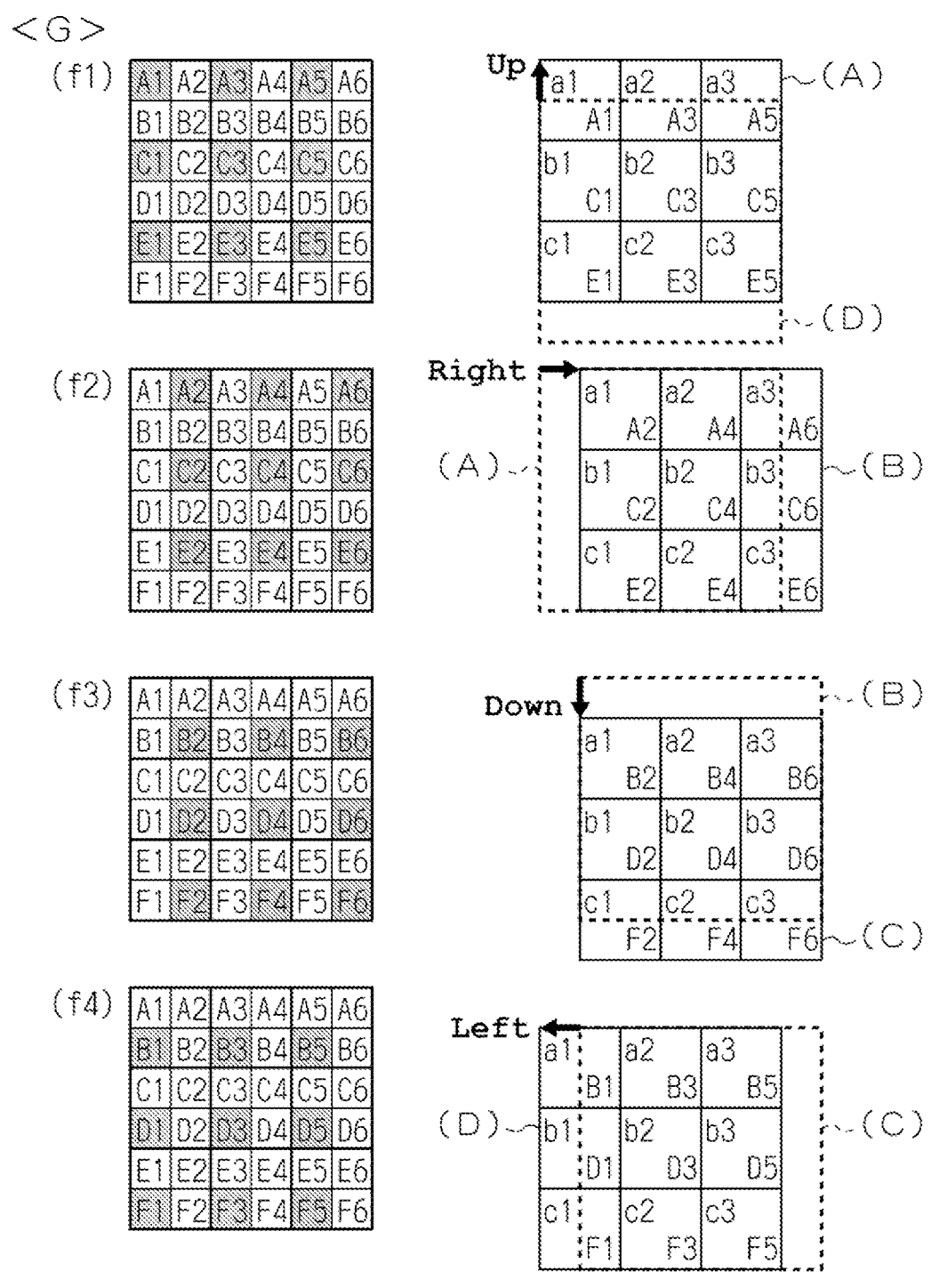

FIG. 5 is a diagram illustrating at which projection position in the liquid crystal projector 1, the panel pixel of the liquid crystal panel 100G corresponding to G of three colors of RGB displays the display pixel of G of the video data Vid-in. Specifically, FIG. 5 is a diagram illustrating, in the subframes f1 to f4, which display pixel of the display pixels of FIG. 4 is displayed at which projection position by the panel pixel of FIG. 4. The first stage in FIG. 5 illustrates that, in the subframe f1, for example, the panel pixel a1 displays information corresponding to the display pixel A1 and projects the information to a first projection position. The second stage in FIG. 5 illustrates that, in the subsequent subframe f2, for example, the panel pixel a1 displays information corresponding to the display pixel A2 and projects the information to a second projection position. The third stage in FIG. 5 illustrates that, in the subsequent subframe f3, for example, the panel pixel a1 displays information corresponding to the display pixel B2 and projects the information to a third projection position. The fourth stage in FIG. 5 illustrates that, in the subsequent subframe f4, for example, the panel pixel a1 displays information corresponding to the display pixel B1 and projects the information to a fourth projection position. Thereby, a high-resolution image based on the display pixels A1, A2, B2, and B1 can be displayed using the panel pixel a1 in one frame F. In the present embodiment, the display pixel A1, the display pixel A2, the display pixel B2, and the display pixel B1 correspond to a first display pixel, a second display pixel, a third display pixel, and a fourth display pixel, respectively. Further, the subframe f1, the subframe f2, the subframe f3, and the subframe f4 correspond to a first period, a second period, a third period, and a fourth period, respectively. Further, the first projection position, the second projection position, the third projection position, and the fourth projection position are the projection positions corresponding to a first position, a second position, a third position, and a fourth position of the emission optical path of the synthesized image, respectively.

For convenience, in order to explain the projection position by the optical shift element 230, the projection position in the subframe f1 that is the first of the frame F is referred to as (A).

In the subframe f1, one panel pixel expresses a hatched display pixel located at the upper left of 2×2 display pixels. Specifically, in the subframe f1, the panel pixels a1 to a3, b1 to b3, and c1 to c3 express the display pixels A1, A3, A5, C1, C3, C5, E1, E3, and E5 in order. Here, for example, the panel pixel a1 expresses the display pixel A1 means that the panel pixel a1 of the liquid crystal panel 100G has a transmittance corresponding to the gray scale level of the G component in the display pixel A1 indicated by the video data Vid-in.

In the subsequent subframe f2, the optical shift element 230 sets the projection position to the projection position (B) that is shifted to the right (Right) direction in the figure by 0.5 pixel by the panel pixel from the projection position (A) of the subframe f1 illustrated by a dashed line.

Further, in the subframe f2, one panel pixel expresses a hatched display pixel located at the upper right of 2×2 display pixels. Specifically, in the subframe f2, the panel pixels a1 to a3, b1 to b3, and c1 to c3 express the display pixels A2, A4, A6, C2, C4, C6, E2, E4, and E6 in order.

In the subframe f3, the optical shift element 230 sets the projection position to the projection position (C) that is shifted to the downward (Down) direction in the figure by 0.5 pixel by the panel pixel from the projection position (B) of the subframe f2 illustrated by the dashed line.

Further, in the subframe f3, one panel pixel expresses a hatched display pixel located at the lower right of 2×2 display pixels. Specifically, in the subframe f3, the panel pixels a1 to a3, b1 to b3, and c1 to c3 express the display pixels B2, B4, B6, D2, D4, D6, F2, F4, and F6 in order.

Then, in the subframe f4, the optical shift element 230 sets the projection position to the projection position (D) that is shifted to the left (Left) direction in the figure by 0.5 pixel by the panel pixel from the projection position (C) of the subframe f3 illustrated by the dashed line.

Further, in the subframe f3, one panel pixel expresses a hatched display pixel located at the lower left of 2×2 display pixels. Specifically, in the subframe f4, the panel pixels a1 to a3, b1 to b3, and c1 to c3 represent the display pixels B1, B3, B5, D1, D3, D5, F1, F3, and F5 in order.

After the subframe f4, the optical shift element 230 shifts the projection position from the projection position (D) of the subframe f4 illustrated by the dashed line to the upward (UP) direction in the figure by 0.5 pixel by the panel pixel, and returns to the projection position (A).

Figure 6:
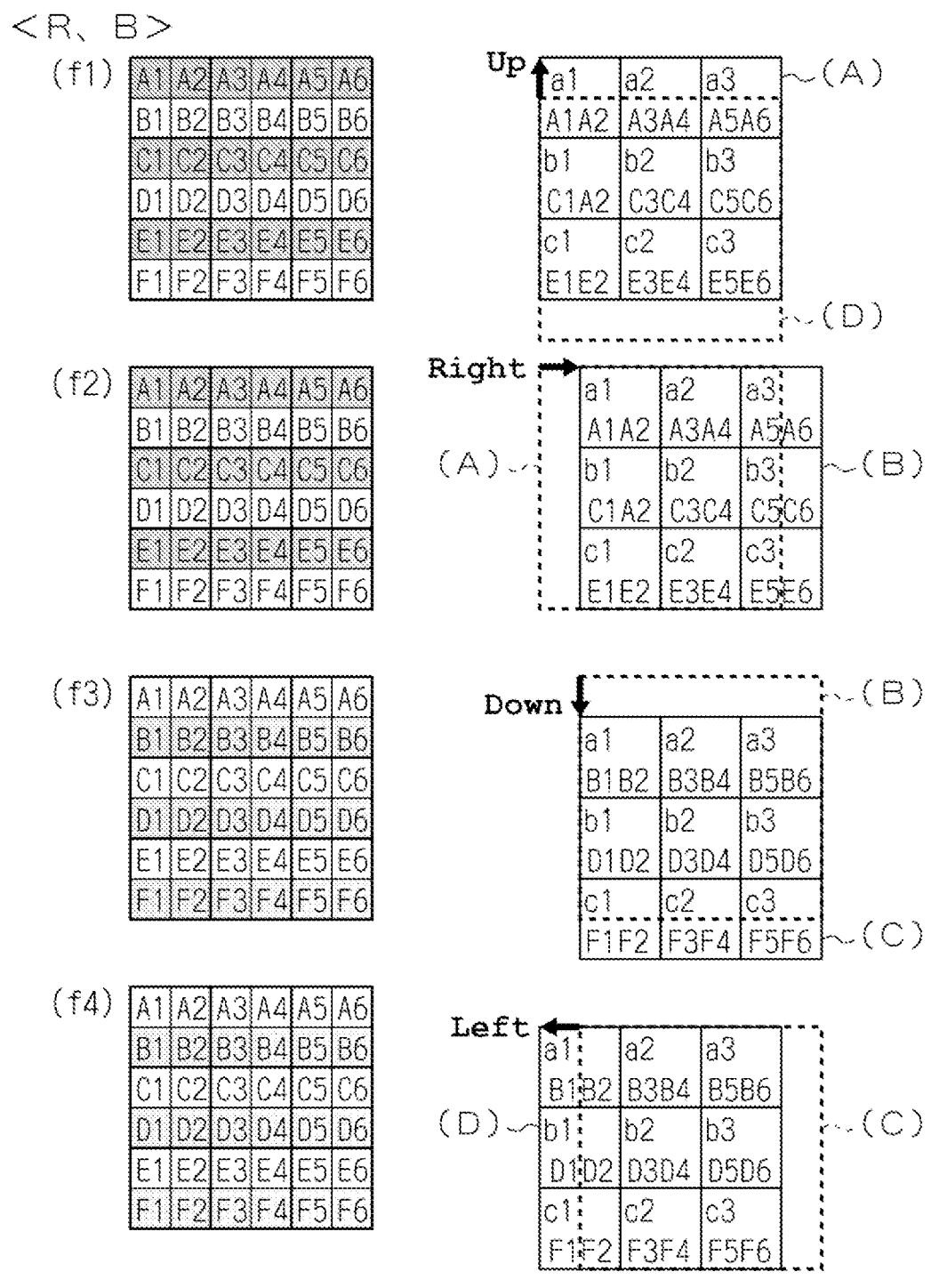

FIG. 6 is a diagram illustrating at which projection position in the liquid crystal projector 1, the panel pixel of the liquid crystal panel 100R corresponding to R of three colors of RGB displays the display pixel of the R component of the video data Vid-in.

Since the optical shift element 230 shifts the emission optical path of the synthesized image, the projection position is common in RGB. Therefore, the projection position of the panel pixels of R in the subframe f1 is the projection position (A) as in G.

The first stage in FIG. 6 illustrates that, in the first period (f1), for example, the panel pixel a1 displays information corresponding to the first display pixel (A1) and the second display pixel (A2), and projects the information to the first projection position (A). The second stage in FIG. 6 illustrates that, in the subsequent second period (f2), for example, the panel pixel a1 displays information corresponding to the first display pixel (A1) and the second display pixel (A2), and projects the information to the second projection position (B). The third stage in FIG. 5 illustrates that, in the subsequent third period (f3), For example, the panel pixel a1 displays information corresponding to the third display pixel (B2) and the fourth display pixel (B1), and projects the information to the third projection position (C). The fourth stage in FIG. 5 illustrates that, in the subsequent fourth period (f4), for example, the first panel pixel a1 displays information corresponding to the third display pixel (B2) and the fourth display pixel (B1), and projects the information to the fourth projection position (D). As a result, although it is lower than the expression by the above-described liquid crystal panel 100G, a high-resolution image can be displayed by the first display pixel A1 and the second display pixel A2, and the third display pixel B2 and the fourth display pixel B1, by using the panel pixel a1 in one frame.

In the subframe f1 illustrated in FIG. 6, one panel pixel of R expresses an average value of the gray scale level of R in the upper left display pixel and the gray-scale level of R in the upper right display pixel of the 2×2 display pixels. Note that, the upper left display pixel and the upper right display pixel of the 2×2 display pixels are hatched. Expressing the average value of the gray scale level means having the transmittance corresponding to the average value of the gray scale level.

For example, in the subframe f1, the panel pixel a1 of R expresses the average value of the gray scale level of R in the display pixel A1 and the gray scale level of R in the display pixel A2. In the panel pixels of FIG. 6, "A1A2" of the panel pixel a1 means that the average value of the gray scale level of the display pixel A1 and the gray scale level of the display pixel A2 is expressed.

In addition, in the panel pixels of FIG. 6, "A3A4" of the panel pixel a2 also means that the average value of the gray scale level of the display pixel A3 and the gray scale level of the display pixel A4 is expressed. This applies to other panel pixels.

The projection position of the panel pixels of R in the subframe f2 is the projection position (B) as in G. Further, in the subframe f2, continuously from the subframe f1, one panel pixel of R expresses the average value of the gray scale level of R in the upper left display pixel and the gray-scale level of R in the upper right display pixel of the 2×2 display pixels.

Therefore, one panel pixel of R continues to have the transmittance corresponding to the average value from the subframe f1 to the subframe f2.

The projection position of the panel pixels of R in the subframe f3 is the projection position (C) as in G.

In the subframe f3, one panel pixel of R expresses the average value of the gray scale level of R in the lower right display pixel and the gray scale level of R in the lower left display pixel of the 2×2 display pixels.

For example, in the subframe f1, the panel pixel a1 of R expresses the average value of the gray scale level of R in the display pixel B2 and the gray scale level of R in the display pixel B1.

The projection position of the panel pixels of R in the subframe f4 is the projection position (D) as in G. Further, in the subframe f4, continuously from the subframe f3, one panel pixel of R expresses an average value of the gray scale level of R in the lower right display pixel and the gray scale level of R in the lower left display pixel of the 2×2 display pixels.

Therefore, one panel pixel of R continues to have the transmittance corresponding to the average value from the subframe f3 to the subframe f4.

It is the same as R that the panel pixel of the liquid crystal panel 100B corresponding to B displays the display pixel of the B component of the video data Vid-in at which projection position.

Returning to FIG. 2 again, the display control circuit 21 generates a control signal Ctr for controlling the scanning of the liquid crystal panel 100 for each subframe. The control signal Ctr includes a control signal for controlling the selection of a scanning line 12 of the liquid crystal panel 100 and a control signal for supplying a data signal to a data line 14. Note that in the present embodiment, the control signal Ctr is commonly supplied to the liquid crystal panels 100R, 100G, and 100B.

Further, the display control circuit 21 outputs a control signal Lac for controlling the projection position by the optical shift element 230 for each subframe.

The control signal Lac includes a control signal Lac_Y that shifts the projection position upward and downward, and a control signal Lac_X that shifts the projection position left and right, on the screen Scr. Specifically, among the projection positions by the optical shift element 230, the upward or downward direction is specified by the voltage of the control signal Lac_Y, and the left or right direction is specified by the voltage of the control signal Lac_X.

More specifically, as will be described later, the optical shift element 230 sets the projection position to the projection position (A) or (B) when the voltage of the control signal Lac_Y is the highest value, and sets the projection position to the projection position (C) or (D) when the voltage of the control signal Lac_Y is the lowest value. When the voltage of the control signal Lac_Y is from the highest value to the lowest value, the optical shift element 230 sets the projection position between the projection position (A) or (B) and the projection position (C) or (D) according to the voltage.

Further, the optical shift element 230 sets the projection position to the projection position (A) or (D) when the voltage of the control signal Lac_X is the highest value, and sets the projection position to the projection position (B) or (C) when the voltage of the control signal Lac_X is the lowest value. When the voltage of the control signal Lac_X is from the highest value to the lowest value, the optical shift element 230 sets the projection position between the projection position (A) or (D) and the projection position (B) or (C) according to the voltage.

The video processing circuit 22 includes a storage device 221 and processing devices 222R, 222G, and 222B.

The storage device 221 temporarily stores the video data Vid-in supplied from the upper device. The processing device 222R reads the video data of R among the video data Vid-in stored in the storage device 221, averages two gray scale levels of the video data, converts the averaged gray scale level into an analog signal, and outputs the analog signal as a data signal Vid-R.

Similar to the processing device 222R, the processing device 222B also reads the video data of B among the video data Vid-in stored in the storage device 221, averages two gray scale levels of the video data, converts the averaged gray scale level into the analog signal, and outputs the analog signal as a data signal Vid-B.

Note that, as described above, in the subframes f1 and f2, the target of averaging is the gray scale levels of the display pixels, and in the subframes f3 and f4, is the gray scale levels of the lower right and the lower left display pixels of the 2×2 display pixels.

Further, in order to output the data signals Vid-R and Vid-B obtained by averaging the gray scale levels in the subframe f1, the video data Vid-in of the subframe f2 must be in a state of obtainable at the time of averaging. Therefore, actually, the processing devices 222R and 222B perform the averaging after the time when the video data Vid-in corresponding to the subframe f2 is stored in the storage device 221 from the upper device.

The processing device 222G reads the video data of G among the video data Vid-in stored in the storage device 221, converts the gray scale level of the read video data into the analog signal, and outputs the analog signal as a data signal Vid-G.

Unlike R and B, the processing device 222G does not execute the averaging process, but outputs the data signal Vid-G at a timing matched with the data signal Vid-R by the processing device 222R and the data signal Vid-B by the processing device 222B.

Next, the liquid crystal panels 100R, 100G, and 100G will be described as a general liquid crystal panel 100 without specifying the color.

Figure 7:
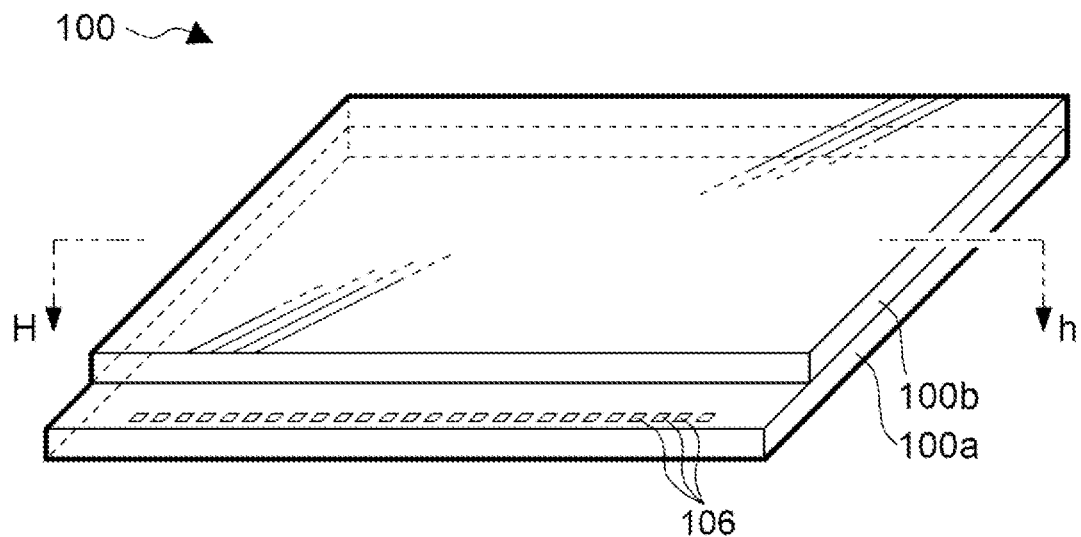
FIG. 7 is a perspective view of a liquid crystal panel in the liquid crystal projector.
Figure 8:
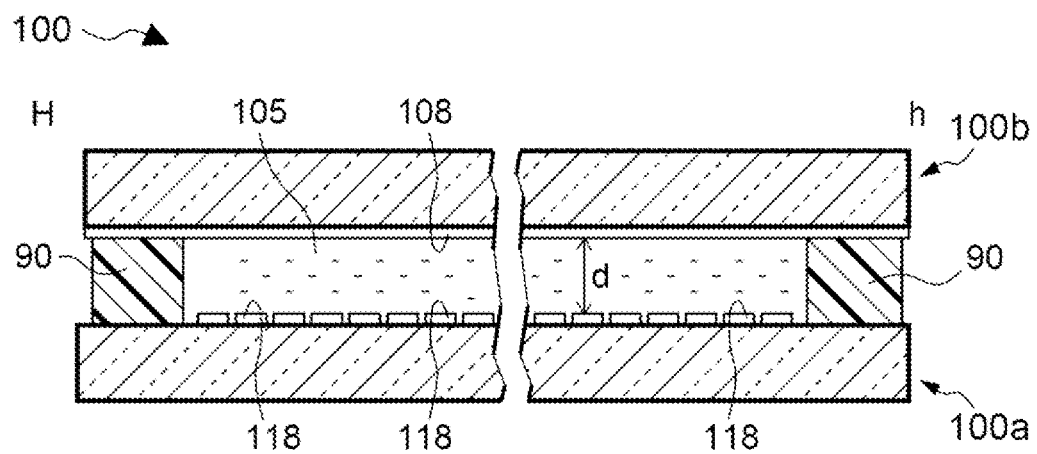
FIG. 8 is a cross-sectional view illustrating the structure of the liquid crystal panel.

FIG. 7 is a diagram illustrating a main portion of the liquid crystal panel 100, and FIG. 8 is a cross-sectional view taken along a line H-h in FIG. 7.

As illustrated in these figures, in the liquid crystal panel 100, an element substrate 100a provided with a pixel electrode 118 and a counter substrate 100b provided with a common electrode 108 are adhered to each other by a seal material 90 including a spacer (not illustrated) such that electrode forming surfaces face each other, while maintaining a constant cell gap d, and liquid crystal 105 is sealed in the cell gap.

As each of the element substrate 100a and the counter substrate 100b, a light-transmissive substrate such as glass and quartz is used. As illustrated in FIG. 7, one side of the element substrate 100a projects from the counter substrate 100b. A plurality of terminals 106 are provided along the one side of the projection region. One end of an FPC board is coupled to the plurality of terminals 106. The other end of the FPC board is coupled to the control circuit 20 and various signals and the like described above are supplied.

A pixel electrode 118 is formed at a surface of the element substrate 100a opposing to the counter substrate 100b by patterning a conductive layer having transparency such as ITO, for example. Note that ITO is an abbreviation for Indium Tin Oxide. Further, various elements other than the electrodes are provided at the opposing surface of the element substrate 100a and the opposing surface of the counter substrate 100b, but are omitted from the figures.

Figure 9:
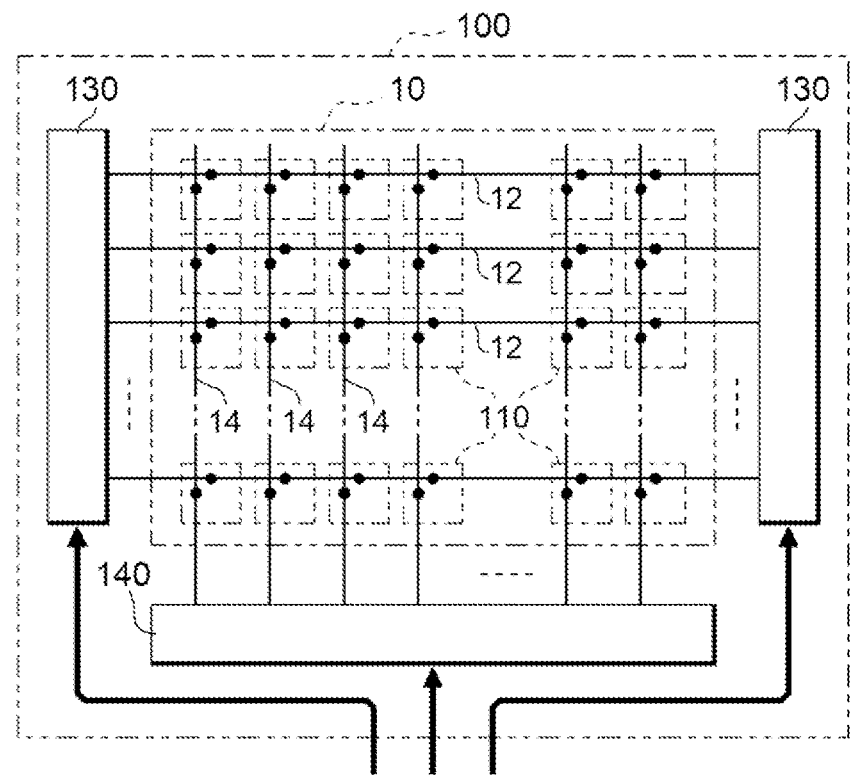
FIG. 9 is a block diagram illustrating a configuration of the liquid crystal panel.

FIG. 9 is a block diagram illustrating an electrical configuration of the liquid crystal panel 100. The liquid crystal panel 100 is provided with a scanning line drive circuit 130 and a data line drive circuit 140 at the periphery of a display region 10.

In the display region 10 of the liquid crystal panel 100, pixel circuits 110 are arranged in a matrix. Specifically, in the display region 10, a plurality of scanning lines 12 are provided so as to extend in the horizontal direction in the figure, and a plurality of data lines 14 are provided so as to extend in the vertical direction in the figure while mutually maintaining electrical insulation with the scanning lines 12. Then, the pixel circuits 110 are provided in a matrix in correspondence with the intersection of the plurality of scanning lines 12 and the plurality of data lines 14.

When the number of scanning lines 12 is m and the number of data lines 14 is n, the pixel circuits 110 are arranged in a matrix of vertical m rows and horizontal n columns as described above. In the scanning lines 12 and the pixel circuits 110, in order to distinguish the rows of the matrix from each other, the rows may be referred as 1, 2, 3, . . . , and m row in order from the top in the figure. Similarly, in the data lines 14 and the pixel circuits 110, in order to distinguish the columns of the matrix from each other, the columns may be referred as 1, 2, 3, . . . , and n column in order from the left in the figure.

In accordance with the control by the display control circuit 21, the scanning line drive circuit 130 selects the scanning line 12 one by one in order of, for example, 1, 2, 3, . . . , m-th row, and sets a scanning signal to the selected scanning line 12 to the H level. The scanning line drive circuit 130 sets the scanning signal to the scanning lines 12 other than the selected scanning line 12 to the L level.

The data line drive circuit 140 latches the data signal supplied from the video processing circuit 22 for one row in accordance with the control by the display control circuit 21, and in a period in which the scanning signal to the scanning line 12 is at the H level, the data line drive circuit 140 outputs the data signal, via the data line 14, to the pixel circuit 110 located at the scanning line 12.

Figure 10:
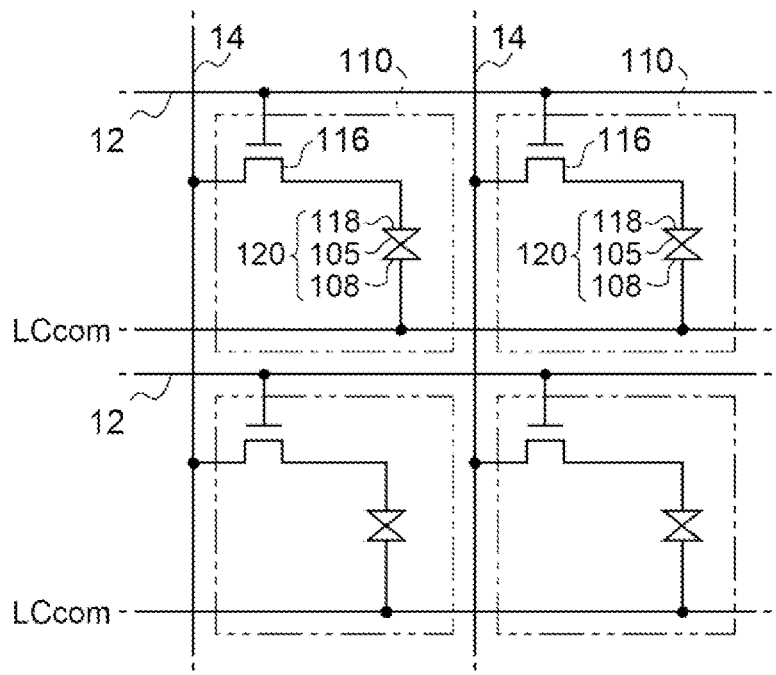
FIG. 10 is a diagram illustrating a configuration of a pixel circuit in the liquid crystal panel.

FIG. 10 is a diagram illustrating an equivalent circuit of the pixel circuit 110, which is a total of four of two rows and two columns, corresponding to intersections between two adjacent scanning lines 12 and two adjacent data lines 14.

As illustrated in the figure, the pixel circuit 110 includes a transistor 116 and a liquid crystal element 120. The transistor 116 is, for example, an n-channel type thin film transistor. In the pixel circuit 110, the gate node of the transistor 116 is coupled to the scanning line 12, while the source node thereof is coupled to the data line 14, and the drain node thereof is coupled to the pixel electrode 118 that is substantially square in plan view.

The common electrode 108 is commonly provided to all pixel circuits so as to face the pixel electrode 118. A voltage LCcom is applied to the common electrode 108. Then, the liquid crystal 105 is sandwiched between the pixel electrode 118 and the common electrode 108. Therefore, the liquid crystal element 120 in which the liquid crystal 105 is sandwiched by the pixel electrode 118 and the common electrode 108 is configured for each pixel circuit 110.

A storage capacitor may be provided in parallel with the liquid crystal element 120, but this is not critical in the present case and is therefore omitted.

In the scanning line 12 in which the scanning signal reaches the H level, the transistor 116 of the pixel circuit 110 provided so as to correspond to the scanning line 12 is turned on. When the transistor 116 is turned on, the data line 14 and the pixel electrode 118 are in an electrically coupled state, so that the data signal supplied to the data line 14 reaches the pixel electrode 118 via the turned-on transistor 116. The scanning line 12 falls to L level, then the transistor 116 is turned off, and the voltage of the data signal having reached the pixel electrode 118 is retained by the capacitance of the liquid crystal element 120.

As is well known, in the liquid crystal element 120, the alignment state of the liquid crystal molecules varies in accordance with the electric field generated by the pixel electrode 118 and the common electrode 108. Accordingly, the liquid crystal element 120 has a transmittance according to an effective value of the applied voltage. Note that in the present embodiment, the normally black mode in which the transmittance increases as the applied voltage to the liquid crystal element 120 increases is used.

The operation of supplying the data signal to the pixel electrode 118 of the liquid crystal element 120 is executed in the order of 1, 2, 3, . . . , and m-th row in the period of one subframe, so that the voltage corresponding to the data signal is retained in each of the liquid crystal elements 120 of the pixel circuit 110 arranged in m rows n columns. By retaining such a voltage, each liquid crystal element 120 has a desired transmittance, and the liquid crystal elements 120 arranged in m rows n columns generate the modulated image of the corresponding color.

Figure 11:
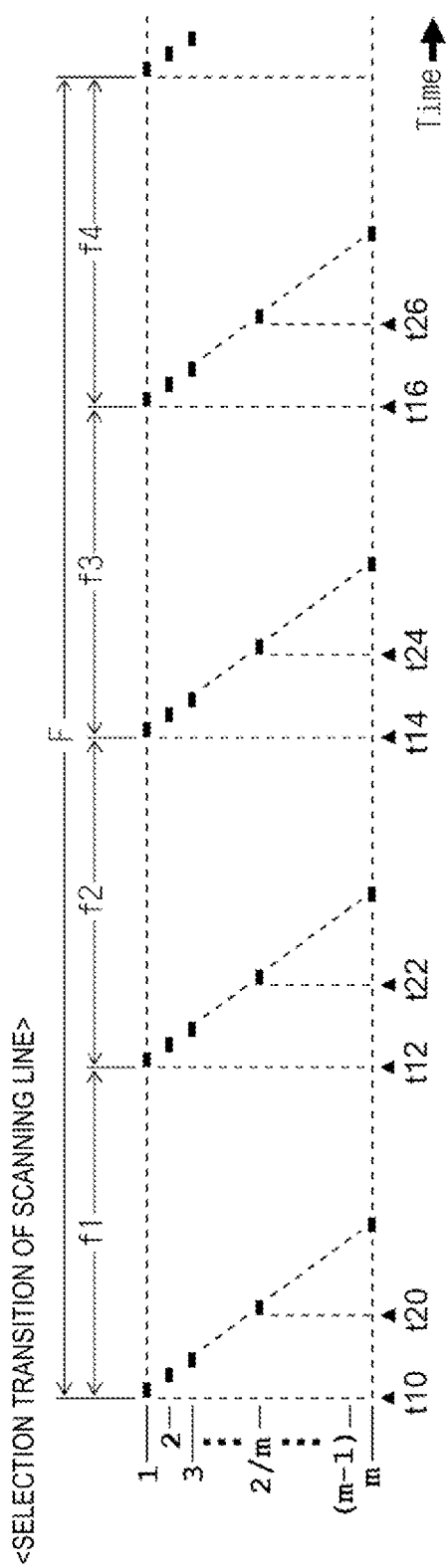
FIG. 11 is a diagram illustrating selection transition of a scanning line in the liquid crystal panel.

FIG. 11 is a diagram illustrating an example of selection transition of the scanning line 12.

The selection transition of the scanning line 12 means to show that how the selected scanning line 12 transits in time when from the first row to the m-th row of the scanning line 12 is taken as the vertical axis and the elapsed time is taken as the horizontal axis. When a state in which the scanning line 12 is selected is indicated by a thick black line, the scanning line 12 is exclusively selected one by one in each period of the subframes f1 to f4. The order of the selections is 1, 2, 3, . . . , and m-th row as described above.

When one scanning line 12 is selected in one subframe, the following data signal is supplied to one data line 14. Specifically, the data signal obtained by converting the gray scale level of the display pixel corresponding to the subframe, or the average value of two gray scale levels is supplied to the one data line 14, among the four display pixels corresponding to the panel pixel.

In FIG. 11, a timing t10 is the start timing of the subframe f1, and more specifically, is the timing at which the scanning signal to the scanning line 12 of the first row that is a head of the 1st to m-th rows reaches the H level. Similarly, timings t12, t14, and t16 are the start timings of the subframes f2, f3, and f4 in this order.

Further, a timing t20 is the timing at which, in the subframe f1, the scanning signal to the scanning line 12 of the middle (m/2) row of the 1st to m-th rows reaches the H level. Similarly, timings t22, t24, and t26 are the timings in this order at which, in the subframes f2, f3, and f4, the scanning signal to the scanning line 12 of the middle (m/2) row reaches the H level.

Figure 12:
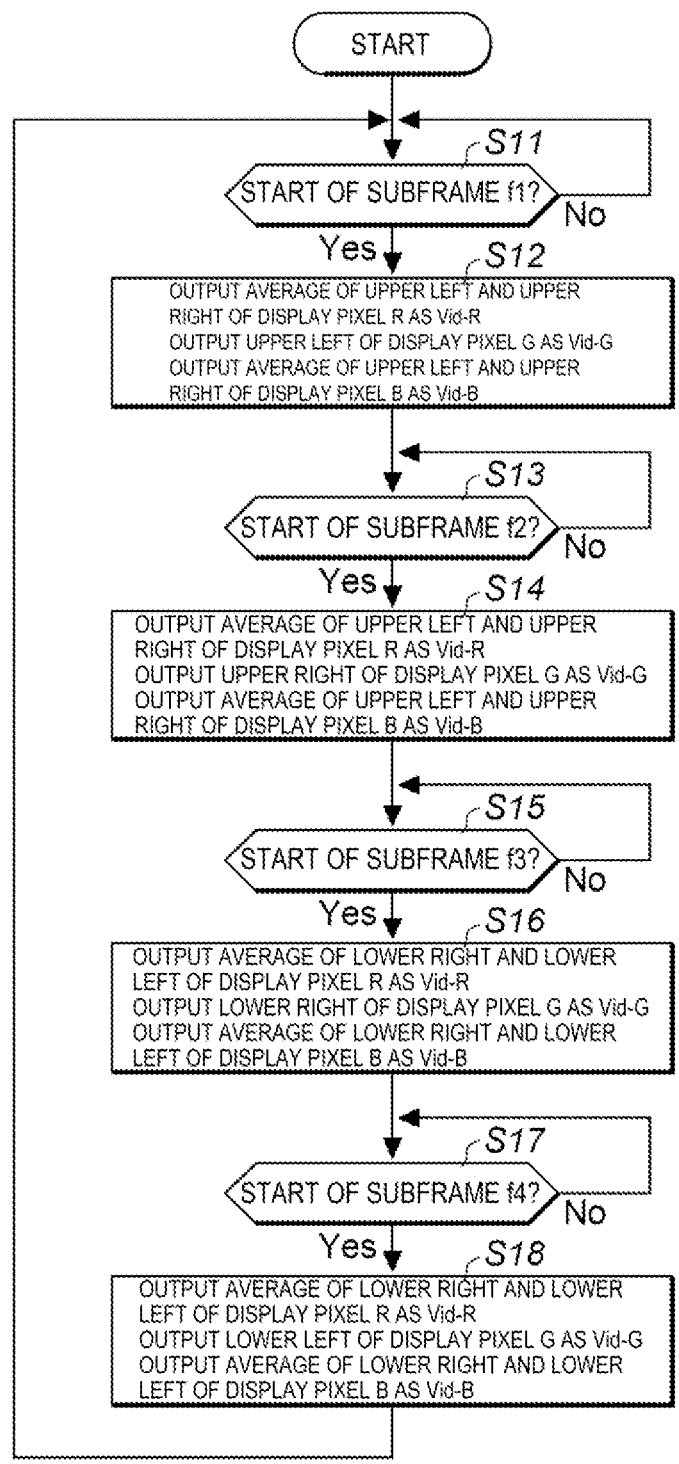
FIG. 12 is a flowchart illustrating processing of a control circuit in the liquid crystal projector.

FIG. 12 is a flowchart illustrating the operation of the video processing circuit 22 in the subframes f1 to f4.

Here, the 2×2 display pixels of the image indicated by the video data Vid-in are conveniently referred to as a single block. The blocks are arranged in the same m rows n columns as the panel pixels. Therefore, the block and the panel pixel are in one-to-one correspondence, and one panel pixel expresses 2×2 display pixels of the block corresponding to the panel pixel while shifting the projection position in the subframes f1 to f4 sequentially. The 2×2 display pixels of the block are, for example, four display pixels of upper left, upper right, lower right, and lower left.

The following processing in the subframes f1 to f4 will be described for one block, but is actually performed for each of the blocks arranged in m rows n columns.

First, the video processing circuit 22 determines whether or not the drive timing of the liquid crystal panels 100R, 100G, and 100B is the start timing of the subframe f1 (step S11). Note that the liquid crystal panels 100R, 100G, and 100B and the optical shift element 230 are controlled by the display control circuit 21. Therefore, the video processing circuit 22 can determine whether or not it is the start timing of the subframe f1 by the control of the display control circuit 21.

If the drive timing is not the start timing of the subframe f1 (if the determination result in step S11 is "No"), the video processing circuit 22 returns the processing procedure to step S11. Therefore, the video processing circuit 22 is in the standby state until the drive timing reaches the start timing of the subframe f1.

When the drive timing becomes the start timing of the subframe f1 (when the determination result in step S11 becomes "Yes"), the video processing circuit 22 outputs the following data signals Vid-R, Vid-G, and Vid-B (step S12).

Specifically, with regard to G, the video processing circuit 22 reads the video data Vid-in of the upper left display pixel of the 2×2 display pixels (one block) from the storage device 221, and converts the gray scale level specified by the video data into the analog signal, and supplies the analog signal to the liquid crystal panel 100G as the data signal Vid-G.

Further, with regard to R, the video processing circuit 22 reads the video data Vid-in of the upper left display pixel and the video data Vid-in of the upper right display pixel of one block from the storage device 221, calculates the average value of the gray scale levels specified by the two video data, converts the average value of the gray scale levels into the analog signal, and supplies the analog signal to the liquid crystal panel 100R as the data signal Vid-R. Similarly for B, the video processing circuit 22 calculates the average value of the gray scale level of the upper left display pixel and the gray scale level of the upper right display pixel of one block, converts the average value of the gray scale levels into the analog signal, and supplies the analog signal to the liquid crystal panel 100B as the data signal Vid-B.

In the subframe f1, such operations are performed in sequence for each block from the first row to the m-th row. Then, the video processing circuit 22 shifts the processing procedure to step S13.

The video processing circuit 22 determines whether or not the drive timing of the liquid crystal panels 100R, 100G, and 100B is the start timing of the subframe f2 (step S13). When the drive timing reaches the start timing of the subframe f2 (when the determination result in step S13 becomes "Yes"), the video processing circuit 22 outputs the following data signals Vid-R, Vid-G, and Vid-B (step S14).

Specifically, with regard to G, the video processing circuit 22 converts the gray scale level specified by the video data Vid-in of the upper right display pixel of one block into the analog signal, and supplies the analog signal to the liquid crystal panel 100G as the data signal Vid-G.

Further, with regard to R, the video processing circuit 22 converts the average value of the gray scale level of the upper left display pixel and the gray scale level of the upper right display pixel of one block, into the analog signal, and supplies the analog signal to the liquid crystal panel 100R as the data signal Vid-R. Therefore, when comparing in the same block and the same panel pixel, the data signals Vid-R in the subframes f1 and f2 are the same. Similarly for B, the video processing circuit 22 converts the average value of the gray scale level of the upper left display pixel and the gray scale level of the upper right display pixel of one block, into the analog signal, and supplies the analog signal to the liquid crystal panel 100B as the data signal Vid-B. Therefore, when comparing in the same block and the same panel pixel, the data signals Vid-B in the subframes f1 and f2 are the same.

In the subframe f2, such operations are performed in sequence for each block from the first row to the m-th row. Then, the video processing circuit 22 shifts the processing procedure to step S15.

The video processing circuit 22 determines whether or not the drive timing of the liquid crystal panels 100R, 100G, and 100B is the start timing of the subframe f3 (step S15). When the drive timing reaches the start timing of the subframe f3 (when the determination result in step S15 becomes "Yes"), the video processing circuit 22 outputs the following data signals Vid-R, Vid-G, and Vid-B (step S16).

Specifically, with regard to G, the video processing circuit 22 converts the gray scale level specified by the video data Vid-in of the lower right display pixel of one block into the analog signal, and supplies the analog signal to the liquid crystal panel 100G as the data signal Vid-G.

Further, with regard to R, the video processing circuit 22 converts the average value of the gray scale level of the lower right display pixel and the gray scale level of the lower left display pixel of one block into the analog signal, and supplies the analog signal to the liquid crystal panel 100R as the data signal Vid-R.

Similarly for B, the video processing circuit 22 converts the average value of the gray scale level of the lower right display pixel and the gray scale level of the lower left display pixel of one block into the analog signal, and supplies the analog signal to the liquid crystal panel 100B as the data signal Vid-B.

In the subframe f3, such operations are performed in sequence for each block from the first row to the m-th row. Then, the video processing circuit 22 shifts the processing procedure to step S17.

The video processing circuit 22 determines whether or not the drive timing of the liquid crystal panels 100R, 100G, and 100B is the start timing of the subframe f4 (step S17). When the drive timing reaches the start timing of the subframe f4 (when the determination result in step S17 becomes "Yes"), the video processing circuit 22 outputs the following data signals Vid-R, Vid-G, and Vid-B (step S18).

Specifically, with regard to G, the video processing circuit 22 converts the gray scale level specified by the video data Vid-in of the lower left display pixel of one block into the analog signal, and supplies the analog signal to the liquid crystal panel 100G as the data signal Vid-G.

Further, with regard to R, the video processing circuit 22 converts the average value of the gray scale level of the lower right display pixel and the gray scale level of the lower left display pixel of one block into the analog signal, and supplies the analog signal to the liquid crystal panel 100R as the data signal Vid-R. Therefore, when comparing in the same block and the same panel pixel, the data signals Vid-R in the subframes f3 and f4 are the same. Similarly for B, the video processing circuit 22 converts the average value of the gray scale level of the lower right display pixel and the gray scale level of the lower left display pixel of one block into the analog signal, and supplies the analog signal to the liquid crystal panel 100B as the data signal Vid-B. Therefore, when comparing in the same block and the same panel pixel, the data signals Vid-B in the subframes f3 and f4 are the same.

In the subframe f4, such operations are performed in sequence for each block from the first row to the m-th row. Then, the video processing circuit 22 returns the processing procedure to step S11 and prepares for the next frame.

Such operations of steps S11 to S18 are repeatedly performed until the power supply is switched off or the supply of the video data Vid-in from the upper device is cut off.

Figure 13:
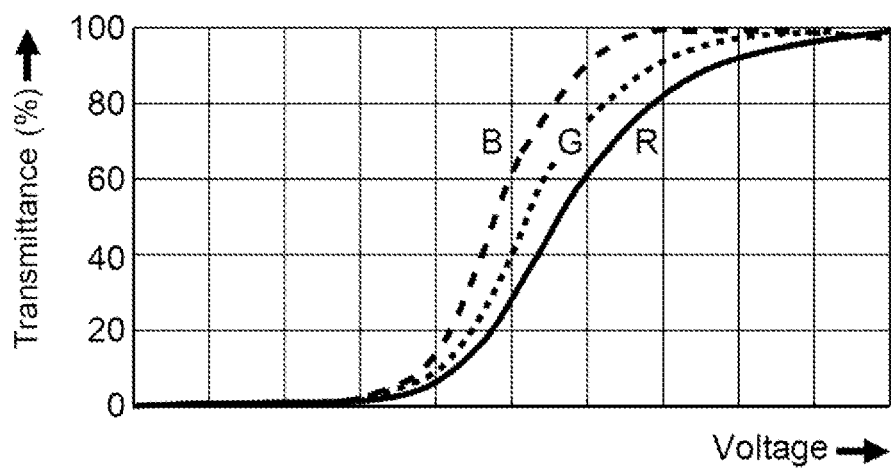
FIG. 13 is a diagram illustrating the relationship between applied voltage and a transmittance when a cell gap is narrow.

FIG. 13 is a diagram illustrating the relationship between the optical response of the liquid crystal element 120 in the liquid crystal panel 100G and the optical response of the liquid crystal element in the liquid crystal panel 100R (or 100B).

Note that the optical response means a change in the transmittance after the voltage is applied to the liquid crystal element 120.

This example illustrates a case in which, of one block, the gray scale levels of the upper left and lower right display pixels are the highest values in RGB, and the gray scale levels of the upper right and lower left display pixels are specified to be the lowest values in RGB. Further, in this example, it is assumed that the liquid crystal element 120 is located at the middle (m/2) row.

In this example, it is ideal for the transmittance of G in the liquid crystal element 120 to be 100% from the timing t20 to the timing t22, 0% from the timing t22 to the timing t24, 100% from the timing t24 to the timing t26, and 0% from the timing t22 to the timing t28. Note that the transmittance referred to here is a relative transmittance normalized with the lowest value of 0% and the highest value of 100%.

Therefore, the optical response of the liquid crystal element 120 of G is required to change for each subframe according to the change in the gray scale level of the display pixel. That is, in the liquid crystal panel 100G, a relatively fast optical response is required for high resolution expression.

Note that the optical response of the liquid crystal element 120 of G actually changes with time lag as illustrated in the figure.

On the other hand, in R and B, the average value of the gray scale levels of the upper left and lower right display pixels of one block is specified in the subframes f1 and f2. Therefore, the transmittance of R and B in the liquid crystal element 120 is ideally 50% from the timing t20 to the timing t24.

Further, in R and B, the average value of the gray scale levels of the lower right and upper left display pixels of one block is designated in the subframes f3 and f4. Therefore, the transmittance of R and B in the liquid crystal element 120 is ideally 50% from the timing t24 to the timing t28.

Therefore, the optical response of the liquid crystal element 120 of R and B may change for each of the two subframes according to the change in the gray scale level of the display pixel. Accordingly, in the liquid crystal panels 100R and 100B, a fast optical response is not required in comparison with the liquid crystal panel 100G, that is, the optical response can be slow.

FIG. 13 is a diagram illustrating a characteristic example of the transmittance with respect to the applied voltage to the liquid crystal element 120 when the cell gap is narrow. Further, FIG. 14 is a diagram illustrating the characteristic example of the transmittance with respect to the applied voltage to the liquid crystal element 120 when the cell gap is large.

Figure 14:
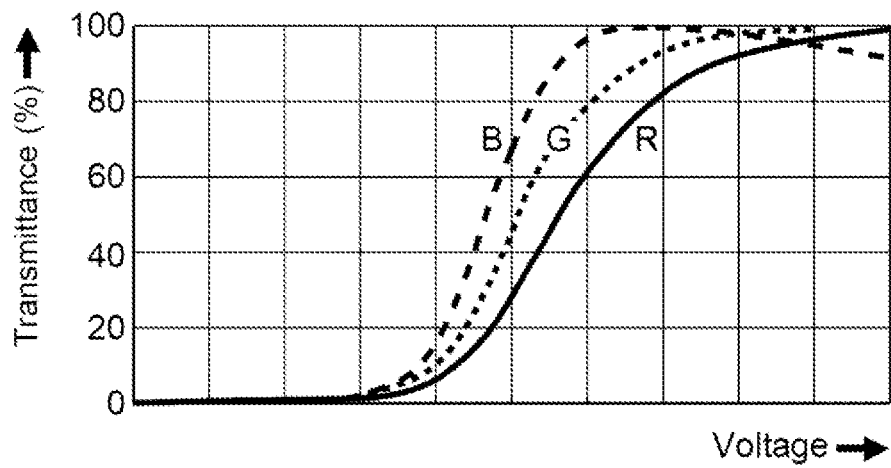
FIG. 14 is a diagram illustrating the relationship between the applied voltage and the transmittance when the cell gap is large.

As illustrated in FIGS. 13 and 14, even when the applied voltage to the liquid crystal element 120 is the same, the transmittance is different when the wavelength (color) of incident light is different. Specifically, when the applied voltage to the liquid crystal element 120 is the same, the transmittance tends to increase as the wavelength of the incident light becomes shorter, and the transmittance is wavelength-dependent. This wavelength dependency appears in the same manner, even when the cell gap is narrow or large.

Next, in cases where the cell gap is narrow and where the cell gap is large, when the applied voltage to the liquid crystal element 120 is the same, the transmittance tends to be higher in the case where the cell gap is large. In other words, when the cell gap is narrow and the applied voltage is the same, the obtained transmittance tends to be low and the brightness tends to decrease.

In order to cause the optical response of the liquid crystal panel 100 to be fast, it is necessary to raise the temperature, narrow the cell gap, and the like. However, as described above, as illustrated in FIGS. 13 and 14, when the cell gap is narrowed, it becomes difficult to obtain high transmittance and the brightness decreases.

According to the present embodiment, in the liquid crystal panels 100R and 100B, the optical response can be slow, so the cell gaps of the liquid crystal panels 100R and 100B may be larger than the cell gap of the liquid crystal panel 100G.

In other words, in the liquid crystal panels 100R and 100B, the optical response can be slow, so that a configuration in which the cell gaps of the liquid crystal panels 100R and 100B are narrowed or a configuration for increasing the temperature of the liquid crystal panels 100R and 100B are not necessary. Further, it is not necessary to reduce the brightness of the liquid crystal panels 100R and 100B. Since the liquid crystal panels 100R and 100B need not have a special configuration, the cost can be suppressed.

Figure 15:
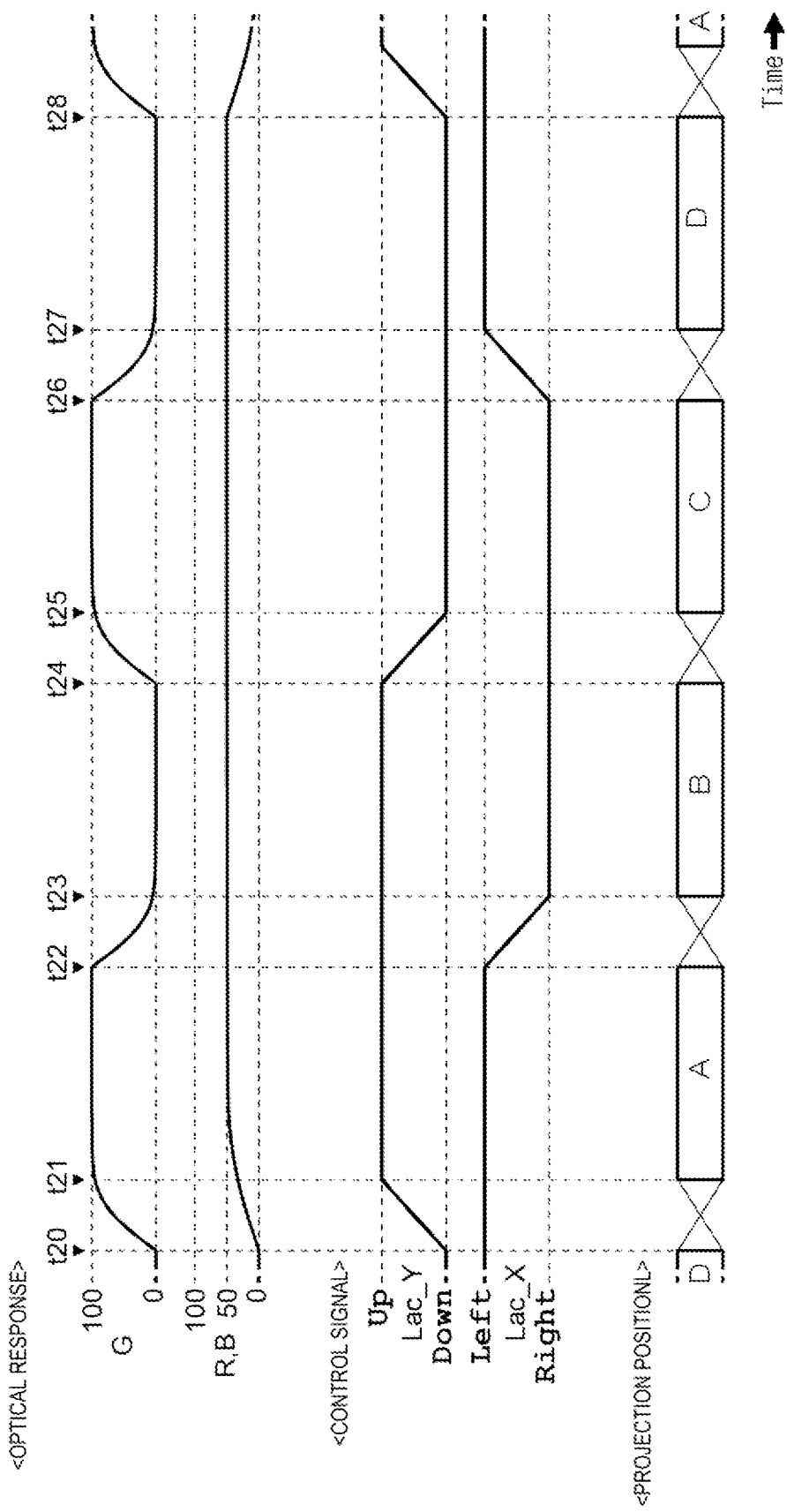
FIG. 15 is an explanatory diagram of an optical response of a liquid crystal element and shift operation by an optical shift element.

FIG. 15 also illustrates the relationship between the projection position by the optical shift element 230 and the control signals Lac_Y and Lac_X.

Specifically, the voltage of the control signal Lac_Y increases from the lowest value to the highest value in the period from the timings t20 to t21, maintains the highest value until the timing t24, decreases from the highest value to the lowest value in the period from the timings t24 to t26, and maintains the lowest value until the timing t20 of the next frame.

Further, the voltage of the control signal Lac_X decreases from the highest value to the lowest value in the period from the timings t22 to t23, maintains the lowest value until the timing t26, increases from the lowest value to the highest value in the period from the timings t26 to t27, and maintains the highest value until the timing t22 of the next frame.

The reason why the voltages of the control signals Lac_Y and Lac_X are set in this way will be described.

As illustrated in FIG. 11, the timing at which the voltage of the data signal is applied to the pixel electrode 118 of the liquid crystal element 120 is earlier as the row of the scanning line 12 corresponding to the liquid crystal element 120 is smaller, and is later as the row is greater. Since scanning is performed from the first row to the m-th row, even when all the liquid crystal elements 120 are rewritten to the same transmittance, a situation in which the transmittance differs in each row occurs.

On the other hand, since the optical shift element 230 shifts the emission optical path of the synthesized image, the shift in each row is common.

Therefore, the optical shift element 230 is, for example, controlled so as to set the projection position of the subframe during a period in which the actual transmittance of G in the intermediate (m/2) row is close to the target value, and in other periods, is controlled so as to move the projection position.

Specifically, for example, in the subframe f1, the optical shift element 230 is controlled to be fixed to the projection position (A) in the period from the timings t21 to t22 when the actual transmittance of the liquid crystal element 120 of G in the middle (m/2) row becomes a value that can be taken as the target transmittance. Similarly, the optical shifting element 230 is controlled to be fixed to the projection position (B) in the period from the timings t23 to t24 in the subframe f2, to be fixed to the projection position (C) in the period from the timings t25 to t26 in the subframe f3, and to be fixed to the projection position (D) in the period from the timings t27 to t28 (the timing t20 of the next frame) in the subframe f4.

Further, from the timings t22 to t23, the optical shift element 230 is controlled so as to shift from the projection position (A) to the projection position (B). Similarly, the optical shift element 230 is controlled so as to shift from the projection position (B) to the projection position (C) from the timings t24 to t25, is controlled so as to shift from the projection position (C) to the projection position (D) from the timings t26 to t27, and is controlled so as to shift from the projection position (D) to the projection position (A) from the timing t28 to the timing t21 of the next frame.

Note that when controlling the projection position of the optical shift element 230 so that the transmittance of the liquid crystal element 120 of G in the middle (m/2) row becomes the target value, the projection position is fixed in a state of the transmittance deviating from the target value with respect to the other rows, in particular, the first row and the m-th row, but since they are separated from the center of the display region 10, and therefore, are less likely to be visually recognized as a decrease in display quality.

The liquid crystal projector 1 according to the embodiment is not limited to the embodiment, and various modifications described below are possible. Further, the exemplary embodiment or each modified example may be appropriately combined.

In the embodiment, the average values of the gray scale levels are calculated in the subframes f1 and f2 and the subframes f3 and f4 for R and B, but the average value of the gray scale levels in the subframes f1 to f4 may be calculated. Further, the present disclosure is not limited to the averaging, and for example, may be configured to convert the gray scale level that is output via a low-pass filter that smoothens the change in the gray scale level into an analog data signal and output.

That is, when viewed in the period of the plurality of continuous subframes, by decreasing the resolution of the modulated images expressed by the liquid crystal panels 100R and 100B than the resolution of the modulated image expressed by the liquid crystal panel 100G, the optical response of the liquid crystal panels 100R and 100B may be made slower than the optical response of the liquid crystal panel 100G.

Although the embodiment is described by using the normally black mode, a normally white mode may be used. Further, the liquid crystal panels 100R, 100G, and 100B are transmission-type, but may also be reflection-type. When the liquid crystal panels 100R, 100G, and 100B are the reflection-type, the transmittance may be read as the reflectance in the above description.

In the embodiment, the optical shift element 230 is configured to shift to the projection surface in two axes in the up-down direction and the left-right direction, but may be configured to shift, for example, in one axis in the up-down direction, the left-right direction, or an oblique direction.

From the embodiment and modifications (hereinafter, referred to as embodiments and the like) described above, for example, the following aspects can be grasped.

A liquid crystal projector according to one aspect (first aspect) includes a synthesizing unit including a first liquid crystal panel configured to generate a first modulated image of first color light, a second liquid crystal panel configured to generate a second modulated image of second color light having a wavelength shorter than that of the first color light, and a third liquid crystal panel configured to generate a third modulated image of third color light having a wavelength shorter than that of the second color light, and configured to synthesize the first modulated image, the second modulated image, and the third modulated image, an optical shift element configured to shift an emission optical path of a synthesized image by the synthesizing unit, and a control circuit configured to control the first liquid crystal panel, the second liquid crystal panel, the third liquid crystal panel, and the optical shift element, wherein the control circuit is configured to control the optical shift element to shift the emission optical path to a first position in a first period and to shift the emission optical path to a second position in a second period after the first period, and is configured to control the first liquid crystal panel, the second liquid crystal panel, the third liquid crystal panel, to cause a resolution of at least one of the first modulated image or the third modulated image expressed in the first period and the second period to be lower than a resolution of the second modulated image expressed in the first period and the second period.

According to this aspect, the optical response required for the first liquid crystal panel or the third liquid crystal panel is alleviated more than the optical response required for the second liquid crystal panel, and therefore a decrease in the brightness of the display image by the first liquid crystal panel or the third liquid crystal panel can be suppressed. Note that the visibility of the first color light and the third color light is inferior to the visibility of the second color light, so even if the resolution of the image of the first color light and the third color light becomes lower than the resolution of the image of the second color light, the effect on the resolution of the synthesized image of the modulated image of the three colors is small. Therefore, a high-resolution and bright display image can be expressed by the first liquid crystal panel, the second liquid crystal panel, and the third liquid crystal panel.

Note that the red color light is an example of the first color light, the green color light is an example of the second color light, and the blue color light is an example of the third color light. Further, the liquid crystal panel 100R is an example of the first liquid crystal panel, the liquid crystal panel 100G is an example of the second liquid crystal panel, and the liquid crystal panel 100B is an example of the third liquid crystal panel. For example, the position of the emission optical path that sets the projection pixel to the projection position (A) by the optical shift element 230 is an example of the first position, and the position of the emission optical path that sets the projection pixel to be the projection position (B) is an example of the second position.

In a specific aspect (second aspect) of the first aspect, the control circuit is configured to cause the resolution of the first modulated image expressed in the first period and the second period, and the resolution of the third modulated image expressed in the first period and the second period to be lower than the resolution of the second modulated image expressed in the first period and the second period.

According to this aspect, a reduction in brightness of the display image by both the first liquid crystal panel and the third liquid crystal panel can be suppressed.

In the liquid crystal projector according to a specific aspect (third aspect) of the second aspect, the control circuit is configured to cause one panel pixel in the first liquid crystal panel to have a gray scale based on a level at which a gray scale level of the first color light of a gray scale level of a first display pixel, and a gray scale level of the first color light of a second display pixel are processed, in the first period and the second period, where the gray scale levels are specified by video data, to cause the one panel pixel in the second liquid crystal panel to have a gray scale based on a level at which a gray scale level of the second color light of the gray scale level of the first display pixel in the first period, and to have a gray scale based on a level at which a gray scale level of the second color light of the gray scale level of the second display pixel in the second period, and to have a gray scale based on a level at which a gray scale level of the third color light of the gray scale level of the first display pixel and a gray scale level of the third color light of the second display pixel are processed, in the first period and the second period.

According to this aspect, the first liquid crystal panel has the same gray scale in the first period and the second period, and specifically, has the gray scale based on the level at which the gray scale level of the first color light in the first display pixel and the gray scale level of the first color light in the second display pixel are processed. Similarly, the third liquid crystal panel has the same gray scale in the first period and the second period. Thus, the first liquid crystal panel and the third liquid crystal panel need only display the same gray scale in the first period and the second period.

In the liquid crystal projector according to a specific aspect (fourth aspect) of the third aspect, the processing is averaging processing, conversion processing, or filtering processing of the gray scale level in the first period and the gray scale level in the second period.

Note that the conversion processing refers to, for example, the gray scale level obtained by referring to the lookup table for the gray scale level in the first period and the gray scale level in the second period, and the filtering processing refers to, for example, the gray scale level obtained by slowing the change from the gray scale level in the first period to the gray scale level in the second period using a low-pass filter.

In the liquid crystal projector according to a specific aspect (fifth aspect) of the fourth aspect, the control circuit is configured to control the optical shift element to shift the emission optical path to a third position after the second period and to shift the emission optical path to a fourth position in a fourth period subsequent to the third period, and to cause a resolution of at least one of the first modulated image or the third modulated image expressed in the third period and the fourth period to be lower than a resolution of the second modulated image expressed in the third period and the fourth period.

According to this aspect, the emission optical path of the synthesized image is shifted from the first position to the fourth position, and thus the resolution can be increased than that of the first aspect.

It should be noted that the first aspect to the fifth aspect can also be expressed as a method for controlling the liquid crystal projector.

What is claimed is:

1. A liquid crystal projector comprising:
    a synthesizing unit including a first liquid crystal panel configured to generate a first modulated image of first color light, a second liquid crystal panel configured to generate a second modulated image of second color light having a wavelength shorter than that of the first color light, and a third liquid crystal panel configured to generate a third modulated image of third color light having a wavelength shorter than that of the second color light, and configured to synthesize the first modulated image, the second modulated image, and the third modulated image,
    an optical shift element configured to shift an emission optical path of a synthesized image by the synthesizing unit, and
    a control circuit configured to control the first liquid crystal panel, the second liquid crystal panel, the third liquid crystal panel, and the optical shift element, wherein
    the control circuit is configured to control the optical shift element to shift the emission optical path to a first position in a first period and to shift the emission optical path to a second position in a second period after the first period, and
    is configured to control the first liquid crystal panel, the second liquid crystal panel, the third liquid crystal panel, to cause a resolution of at least one of the first modulated image or the third modulated image expressed in the first period and the second period to be lower than a resolution of the second modulated image expressed in the first period and the second period.

2. The liquid crystal projector according to claim 1, wherein
    the control circuit is configured to cause the resolution of the first modulated image expressed in the first period and the second period, and the resolution of the third modulated image expressed in the first period and the second period to be lower than the resolution of the second modulated image expressed in the first period and the second period.

3. The liquid crystal projector according to claim 2, wherein
    the control circuit is configured to cause one panel pixel in the first liquid crystal panel to have a gray scale based on a level at which a gray scale level of the first color light of a gray scale level of a first display pixel, and a gray scale level of the first color light of a second display pixel are processed, in the first period and the second period, where the gray scale levels are specified by video data,
    to cause the one panel pixel in the second liquid crystal panel to have a gray scale based on a gray scale level of the second color light of the gray scale level of the first display pixel in the first period, and to have a gray scale based on a gray scale level of the second color light of the gray scale level of the second display pixel in the second period, and
    to cause the one panel pixel in the third liquid crystal panel to have a gray scale based on a level at which a gray scale level of the third color light of the gray scale level of the first display pixel and a gray scale level of the third color light of the second display pixel are processed, in the first period and the second period.

4. The liquid crystal projector according to claim 3, wherein
    the processing is averaging processing, conversion processing, or filtering processing of the gray scale level in the first period and the gray scale level in the second period.

5. The liquid crystal projector according to claim 1, wherein
    the control circuit is configured to control the optical shift element to shift the emission optical path to a third position in a third period subsequent to the second period and to shift the emission optical path to a fourth position in a fourth period subsequent to the third period, and to cause a resolution of at least one of the first modulated image or the third modulated image expressed in the third period and the fourth period to be lower than a resolution of the second modulated image expressed in the third period and the fourth period.

6. A method for controlling a liquid crystal projector, the liquid crystal projector comprising:
    a synthesizing unit including a first liquid crystal panel configured to generate a first modulated image of first color light, a second liquid crystal panel configured to generate a second modulated image of second color light having a wavelength shorter than that of the first color light, and a third liquid crystal panel configured to generate a third modulated image of third color light having a wavelength shorter than that of the second color light, and configured to synthesize the first modulated image, the second modulated image, and the third modulated image, and
    an optical shift element configured to shift an emission optical path of a synthesized image by the synthesizing unit, the method comprising:
    controlling the optical shift element to shift the emission optical path to a first position in a first period and to shift the emission optical path to a second position in a second period after the first period, and
    controlling the first liquid crystal panel, the second liquid crystal panel, the third liquid crystal panel, to cause a resolution of at least one of the first modulated image or the third modulated image expressed in the first period and the second period to be lower than a resolution of the second modulated image expressed in the first period and the second period.

7. The method for controlling the liquid crystal projector according to claim 6, comprising
    causing the resolution of the first modulated image expressed in the first period and the second period, and the resolution of the third modulated image expressed in the first period and the second period to be lower than the resolution of the second modulated image expressed in the first period and the second period.

8. The method for controlling the liquid crystal projector according to claim 7, comprising:
   causing one panel pixel in the first liquid crystal panel to have a gray scale based on a level at which a gray scale level of the first color light of a gray scale level of a first display pixel, and a gray scale level of the first color light of a second display pixel are processed, in the first period and the second period, where the gray scale levels are specified by video data; and
   causing the one panel pixel in the second liquid crystal panel to have a gray scale based on a gray scale level of the second color light of the gray scale level of the first display pixel in the first period, and to have a gray scale based on a gray scale level of the second color light of the gray scale level of the second display pixel in the second period, and
   to cause the one panel pixel in the third liquid crystal panel to have a gray scale based on a level at which a gray scale level of the third color light of the gray scale level of the first display pixel and a gray scale level of the third color light of the second display pixel are processed, in the first period and the second period.

9. The method for controlling the liquid crystal projector according to claim 8, wherein
   the processing is averaging processing, conversion processing, or filtering processing of the gray scale level in the first period and the gray scale level in the second period.

10. The method for controlling the liquid crystal projector according to claim 6, comprising:
   controlling the optical shift element to shift the emission optical path to a third position in a third period subsequent to the second period, and to shift the emission optical path to a fourth position in a fourth period subsequent to the third period, and
   causing a resolution of at least one of the first modulated image or the third modulated image expressed in the third period and the fourth period to be lower than a resolution of the second modulated image expressed in the third period and the fourth period.

* * * * *